No. 672,805. Patented Apr. 23, 1901.
A. PLAWIN.
SINK.
(Application filed Feb. 21, 1901.)
(No Model.)

Witnesses.
H. F. Meyer Jr.
F. S. Stitt.

Inventor.
Alexander Plawin
By Chas. B. Mann,
Attorney.

THE NORRIS PETERS CO., PHOTO-LITHO., WASHINGTON, D. C.

UNITED STATES PATENT OFFICE.

ALEXANDER PLAWIN, OF BALTIMORE, MARYLAND.

SINK.

SPECIFICATION forming part of Letters Patent No. 672,805, dated April 23, 1901.

Application filed February 21, 1901. Serial No. 48,269. (No model.)

*To all whom it may concern:*

Be it known that I, ALEXANDER PLAWIN, a citizen of the United States, residing at Baltimore, State of Maryland, have invented certain new and useful Improvements in Sinks, of which the following is a specification.

This invention relates to improvements in sinks; and its object is to provide a device of this character which is provided with spigots for hot water, cold water, and ice-water, attached to a hinged lid and arranged to be carried by the lid down into the waste-pan of the sink and out of sight when not in use, and which is also provided with a casing for the reception of articles to be kept cool.

The invention consists in certain constructions and arrangements of the parts, hereinafter fully described and claimed, reference being had to the accompanying drawings, in which—

Figure 1:
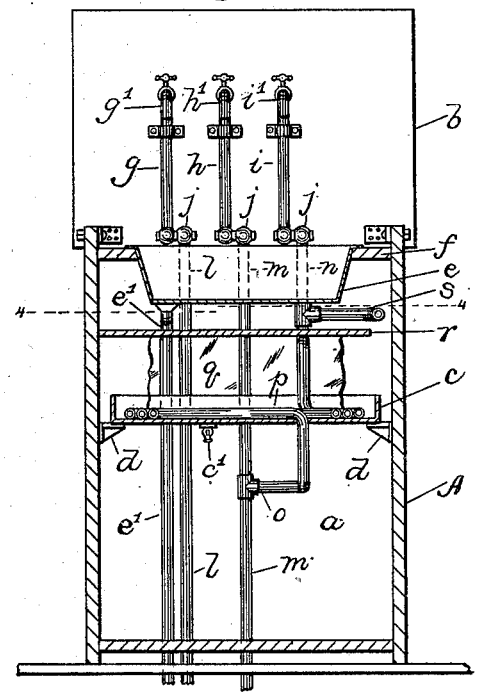
Figure 2:
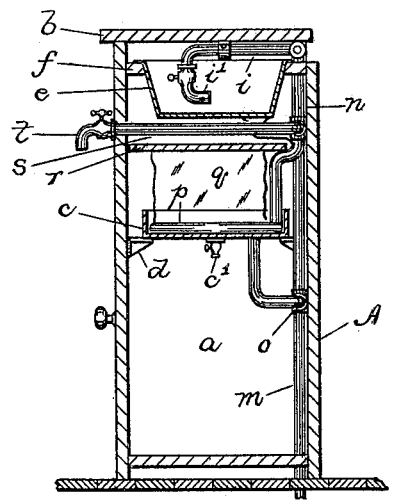
Figure 4:
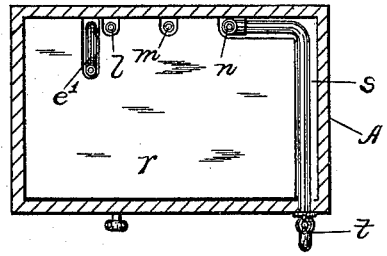
Figure 3:
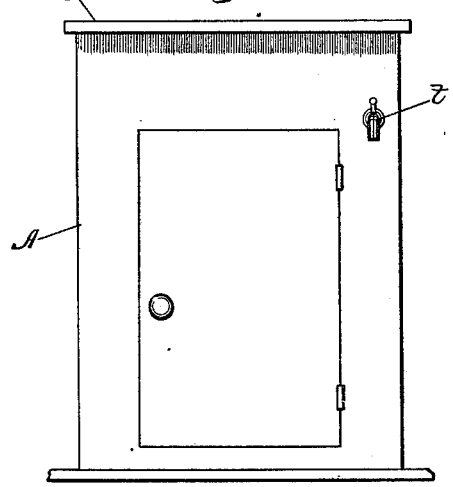
Figure 5:
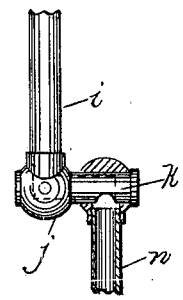

Figure 1 is a sectional front elevation of the sink with its lid raised to bring the hot, cool, and ice water spigots in operative relation to the sink. Fig. 2 is a sectional side elevation thereof with the lid lowered. Fig. 3 is a front elevation of the same with the lid lowered. Fig. 4 is a horizontal sectional view on the line 4 4 of Fig. 1. Fig. 5 is an enlarged detail view of one of the pivot-joints between the movable and stationary portions of the water-pipes.

The casing A of the sink is provided with a lower chamber $a$, intended for the reception of articles to be kept cool, and is also provided at its top with a hinged lid $b$. An ice-pan $c$ is supported on brackets $d$ within said casing, at about the middle thereof, and is provided with a drain-cock $c'$ for the drippings from the ice, and a waste-pan $e$ is supported near the top of said casing by an inwardly-projecting ledge $f$, as shown in Figs. 1 and 2. Said waste-pan is provided with a waste-pipe $e'$, which in this instance extends down through the bottom of the casing A, as shown.

Rigidly secured to the inner face of the hinged lid $b$, so as to move up and down with it, are three spigot-pipes $g$, $h$, and $i$, provided at one end with spigots $g'$, $h'$, and $i'$, intended to discharge, respectively, hot water, the ordinary cool water, and ice-water. The other end of each movable spigot-pipe is connected to a stationary main water-pipe, as shown in detail in Fig. 5, by a pivot-joint $j$, provided with a barrel-plug $k$, whose side port is open to the main water-pipe when the spigot-pipe is in raised position, as in Figs. 1 and 5, but which port is closed when said spigot-pipe is in lowered position, as in Fig. 2. Two of these stationary water-pipes (designated $l$ and $m$) are for the hot and cool water and extend vertically along the inside of the casing A, at the back thereof, and the water-pipe $m$ has a branch $n$ for the ice-water, connected thereto, as at $o$, Figs. 1 and 2. This branch enters the ice-pan and connects with a flat cooling-coil $p$, which rests on the bottom of the ice-pan $c$ and on which a block of ice $q$ may be placed, so that when the spigot $i'$ is opened water from the main cool-water pipe $m$ will flow through said coil and be chilled before it issues from said spigot. A plate $r$, of some material that is a poor conductor of heat, is intended to rest loosely on the top of the ice block $q$, as shown, so as to protect it as far as possible, and said plate is cut out to fit around the several water-pipes, as shown in Fig. 4, and will lower as the ice melts. An auxiliary ice-water pipe $s$ branches out from the stationary water-pipe $n$, just mentioned, and extends horizontally through the front side of the casing, where it is provided with a spigot $t$.

In practice when it is desired to use the hot, cool, and ice water spigots over the waste-pan $e$ the lid of the casing A is raised to the position shown in Fig. 1, which moves the spigot-pipes to vertical position over the sink, and when it is not desired to use the said spigots and waste-pan the lid is lowered to the position shown in Fig. 2, which lowers the said spigot-pipes down into the waste-pan entirely out of sight. With the parts in the position last described the spigot $t$ of the auxiliary ice-water pipe $s$ may be used to draw ice-water.

Having thus described my invention, what I claim as new, and desire to secure by Letters Patent, is—

1. A device of the character described, comprising a casing provided with a hinged lid; a waste-pan in said casing below said lid; main pipes connected with said casing for hot, cool, and ice water; and spigot-pipes secured to said lid and lowered and raised thereby into and out of said waste-pan, said spigot-pipes having a jointed connection with said main pipes which connection closes the latter when the spigot-pipes are lowered into the waste-pan, as set forth.

2. A device of the character described, comprising a casing; a waste-pan in said casing; hot and cool water pipes arranged to discharge into said waste-pan; an ice-pan in said casing below said waste-pan; a cooling-coil in said ice-pan and connected to said cool-water pipe; and an ice-water pipe connected to said coil and also arranged to discharge into said waste-pan, as set forth.

3. A device of the character described, comprising a casing; a waste-pan in said casing; hot and cool water pipes arranged to discharge into said waste-pan; an ice-pan in said casing below said waste-pan; a cooling-coil in said ice-pan and connected to said cool-water pipe; an ice-water pipe connected to said coil and also arranged to discharge into said waste-pan; and a loose plate, $r$, between said ice-pan and said waste-pan, to rest upon the block of ice in said ice-pan, as set forth.

4. A device of the character described, comprising a casing provided with a hinged lid; a waste-pan in said casing below said lid; hot and cool water pipes having spigots secured to said lid and lowered and raised thereby into and out of said sink; an ice-pan in said casing below said waste-pan; a cooling-coil in said pan and connected to said cool-water pipe; a spigot connected with said coil and secured to said hinged lid whereby it is also lowered and raised thereby into and out of said waste-pan; and an auxiliary pipe also connected with said cooling-coil and extending through a side of said casing, whereby it may be used when the lid is lowered, as set forth.

In testimony whereof I affix my signature in the presence of two witnesses.

ALEXANDER PLAWIN.

Witnesses:
F. S. STITT,
CHARLES L. VIETSCH.